US008763979B2

(12) United States Patent  
Blake et al.

(10) Patent No.: US 8,763,979 B2  
(45) Date of Patent: Jul. 1, 2014

(54) VEHICLE SEAT LATCH HAVING STRIKER COMPLIANCE IN TRANSVERSE DIRECTIONS

(75) Inventors: Michael A. Blake, Plymouth, MI (US); Sobieslaw W. Derbis, Auburn Hills, MI (US)

(73) Assignee: Porter Group, LLC, Novi, MI (US)

( * ) Notice: Subject to any disclaimer, the term of this patent is extended or adjusted under 35 U.S.C. 154(b) by 143 days.

(21) Appl. No.: 13/478,480

(22) Filed: May 23, 2012

(65) Prior Publication Data

US 2013/0313395 A1 Nov. 28, 2013

(51) Int. Cl.  
*B60N 2/005* (2006.01)

(52) U.S. Cl.  
USPC ............ 248/503.1; 248/689; 296/65.03

(58) Field of Classification Search  
CPC .. B60N 2/01583; B60N 2/3011; B60N 2/305; B60N 2205/20; B60N 2/01541; B60N 2/3097; B60N 2/366  
USPC ............ 248/689, 544, 503, 503.1; 296/65.03, 296/65.05, 65.06, 65.18; 297/326, 336  
See application file for complete search history.

(56) References Cited

U.S. PATENT DOCUMENTS

| | | | | |
|---|---|---|---|---|
| 5,046,913 A | * | 9/1991 | Domek et al. | 414/522 |
| 6,945,585 B1 | * | 9/2005 | Liu et al. | 296/65.03 |
| 7,367,604 B2 | | 5/2008 | Miller et al. | |
| 7,431,371 B2 | * | 10/2008 | Miller et al. | 296/65.03 |
| 8,333,421 B2 | * | 12/2012 | Blake et al. | 296/65.03 |
| 8,511,723 B2 | * | 8/2013 | Otsuka | 292/216 |
| 8,523,262 B2 | * | 9/2013 | Haeske et al. | 296/65.03 |
| 2005/0104384 A1 | | 5/2005 | Kondo et al. | |
| 2005/0218685 A1 | | 10/2005 | Liu et al. | |
| 2005/0236862 A1 | | 10/2005 | Martone et al. | |
| 2005/0269854 A1 | | 12/2005 | Lutzka et al. | |
| 2006/0082204 A1 | * | 4/2006 | Zhang | 297/366 |
| 2008/0054151 A1 | * | 3/2008 | Shimura et al. | 248/503.1 |
| 2009/0145183 A1 | | 6/2009 | Maeta et al. | |
| 2010/0026013 A1 | * | 2/2010 | Otsuka et al. | 292/121 |
| 2010/0270823 A1 | * | 10/2010 | Iwasa et al. | 296/66 |
| 2012/0251231 A1 | * | 10/2012 | Matsumoto et al. | 403/326 |

OTHER PUBLICATIONS

PCT International Search Report and the Written Opinion of the International Searching Authority, Dated Jul. 11, 2013. 6 Pages.

* cited by examiner

*Primary Examiner* — Bradley Duckworth  
(74) *Attorney, Agent, or Firm* — Brooks Kushman P.C.

(57) ABSTRACT

The vehicle seat latch (16) disclosed includes an elongate pivot plate (32) pivotally mounted by a first pivotal connection (36) on a seat frame (28) by a mounting plate (26). A second pivotal connection (42) mounts a latch assembly (40) on the pivot plate (32). The latch assembly (40) includes a throat plate (46) having a throat (48) for receiving a vehicle body mounted striker (24), and the latch assembly (40) also includes at least one latch member (50, 52) movable between latched and unlatched positions for securing the latch to the striker (24). Pivoting of the pivot plate (32) about the first pivotal connection (36) and pivoting of the throat plate (46) about the second pivotal connection (42) provide the latch assembly with compliance that accommodates for striker position variation along transverse directions, which are vertical and horizontal when the seat is latched to the vehicle floor.

13 Claims, 3 Drawing Sheets

VEHICLE SEAT LATCH HAVING STRIKER COMPLIANCE IN TRANSVERSE DIRECTIONS

TECHNICAL FIELD

This invention relates to a vehicle seat latch for securing a vehicle seat to a vehicle body in which the seat is to be used and having compliance for striker position variation along transverse directions.

BACKGROUND

Vehicle seat latches are conventionally used to secure a vehicle seat to a vehicle body in which the seat is used. For example, the seat latches can be utilized to secure a vehicle seat frame to the floor of the associated vehicle body and can also be used to secure a vehicle seat back in a generally upright seating position. The seat latches can also be moved from a latching condition to an unlatched condition to allow release of the seat.

The attachment of vehicle seat latches to the associated vehicle bodies is provided by latching to a vehicle body striker which can have tolerance variation both as to location and size, the size being the diameter of conventional round strikers. For example, when a seat latch is used for attaching the vehicle seat to the vehicle floor, the variation can be in a longitudinal direction and in a vertical direction that are transverse to each other, and the striker size can also vary.

SUMMARY

An object of the present invention is to provide an improved vehicle seat latch for securing a vehicle seat to a vehicle body in which the seat is to be used.

In carrying out the above object, the vehicle seat latch includes an elongate pivot plate having an end including a first pivotal connection for mounting on a frame of the seat with the pivot plate extending in a first direction from the first pivotal connection. A latch assembly of the seat latch has a second pivotal connection to the pivot plate at a spaced location from the first pivotal connection such that pivoting of the pivot plate about the first pivotal connection moves the latch assembly in a second direction transverse to the first direction. The latch assembly includes a throat plate pivotally mounted on the pivot plate by the second pivotal connection and having a throat for receiving a striker on the vehicle body upon movement toward the striker as the throat plate pivots to provide compliance that accommodates for striker position variation along the first direction. The latch assembly also has at least one latch member pivotally mounted by the second pivotal connection for movement between latched and unlatched positions to respectively secure or release the striker and, upon moving to the latched position with the striker in the throat of the throat plate, pivoting the pivot plate to move the second pivotal connection along the second direction and provide compliance that accommodates for striker position variation along the second direction.

The vehicle seat latch as disclosed is constructed to secure a seat bottom frame to a floor of the vehicle body with the pivot plate extending horizontally in the first direction and with the second connection moving vertically in the second direction as the pivot plate pivots.

The latch is disclosed as having a mounting plate for mounting on the frame of the seat and on which the first pivotal connection mounts the pivot plate. As disclosed, the elongate pivot plate has a second end spaced from its first mentioned end with the second pivotal connection therebetween, and the mounting plate has a stop for contacting the second end of the pivot plate to limit its pivoting movement that provides the movement of the second pivotal connection for providing the compliance that accommodates for striker positioning variation in the second direction. The pivot plate as disclosed has an opening that receives the stop of the mounting plate to limit the pivoting movement of the pivot plate.

The mounting plate as disclosed includes a biaser that biases the pivot plate to move the second pivotal connection toward the striker. The biaser of the mounting plate is disclosed as including an elastic bumper in contact with the first mentioned end of the pivot plate to provide its bias that moves the second pivotal connection toward the striker.

The pivot plate as disclosed includes a stop that contacts the throat plate to limit its pivotal movement on the pivot plate. More specifically, the pivot plate includes an opening that embodies its stop, and the throat plate includes a pin received within the opening providing the stop of the pivot plate to limit the pivoting of the throat plate.

The latch assembly as disclosed includes a pair of latch members with one latch member having a latched position contacting the striker with a pressure angle in the range of 6 to 9 degrees, and with the other latch member having a latched position where it is spaced from the striker. The latch assembly is also disclosed as having a spring biaser that biases the latch members toward their latched positions, and the latch assembly also has a release connection for initially moving the other latch member from its latched position to an unlatched position and for subsequently moving the one latch member from its latched position to an unlatched position.

DETAILED DESCRIPTION

Figure 1:
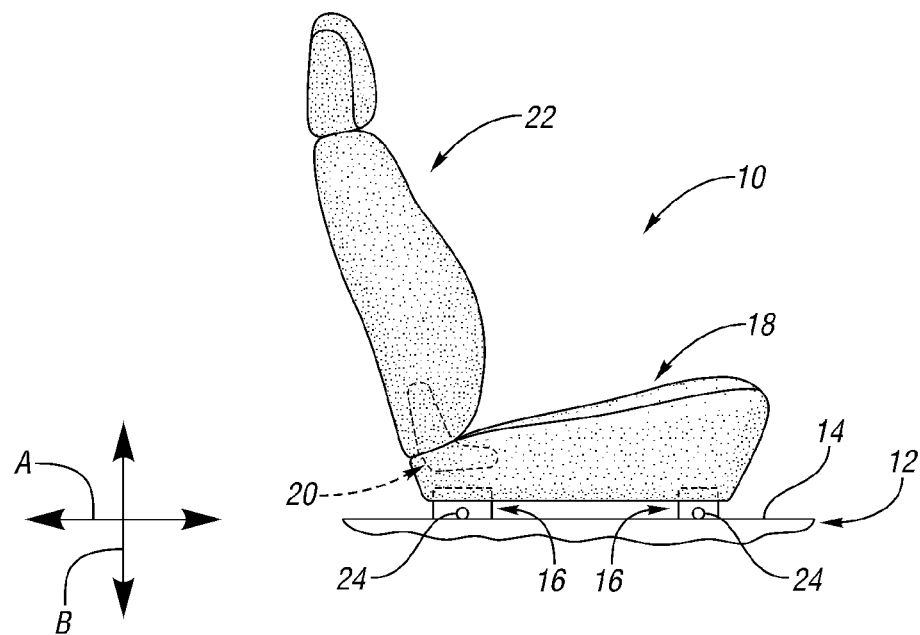
FIG. 1 is a side elevational view of a vehicle seat mounted to a vehicle body by floor latches constructed in accordance with the present invention.

With reference to FIG. 1, a vehicle seat generally indicated by 10 is illustrated as being mounted within a partially illustrated vehicle body 12 on its floor 14 by vehicle seat latches 16 which as shown are mounted at rear and front locations and at opposite lateral sides of the seat to provide support for the seat bottom 18. A recliner 20 of the seat supports a seat back 22 on the seat bottom by connection to frames thereof in a conventional manner. The latches 16 are secured to vehicle body mounted strikers 24 on the floor 14. At least one of the latches is constructed in accordance with the present invention and as is hereinafter described is capable of providing compliance that accommodates for positioned variation of the strikers in transverse directions, specifically in a first longitudinal, front to rear direction shown by arrows A and in a second vertical direction shown by arrows B transverse to the first direction. It should be appreciated that other uses for the latches are also possible such as for securing the upper end of a seat back to a vehicle body in the upright seating position such as illustrated by the seat back 22.

Figure 2:
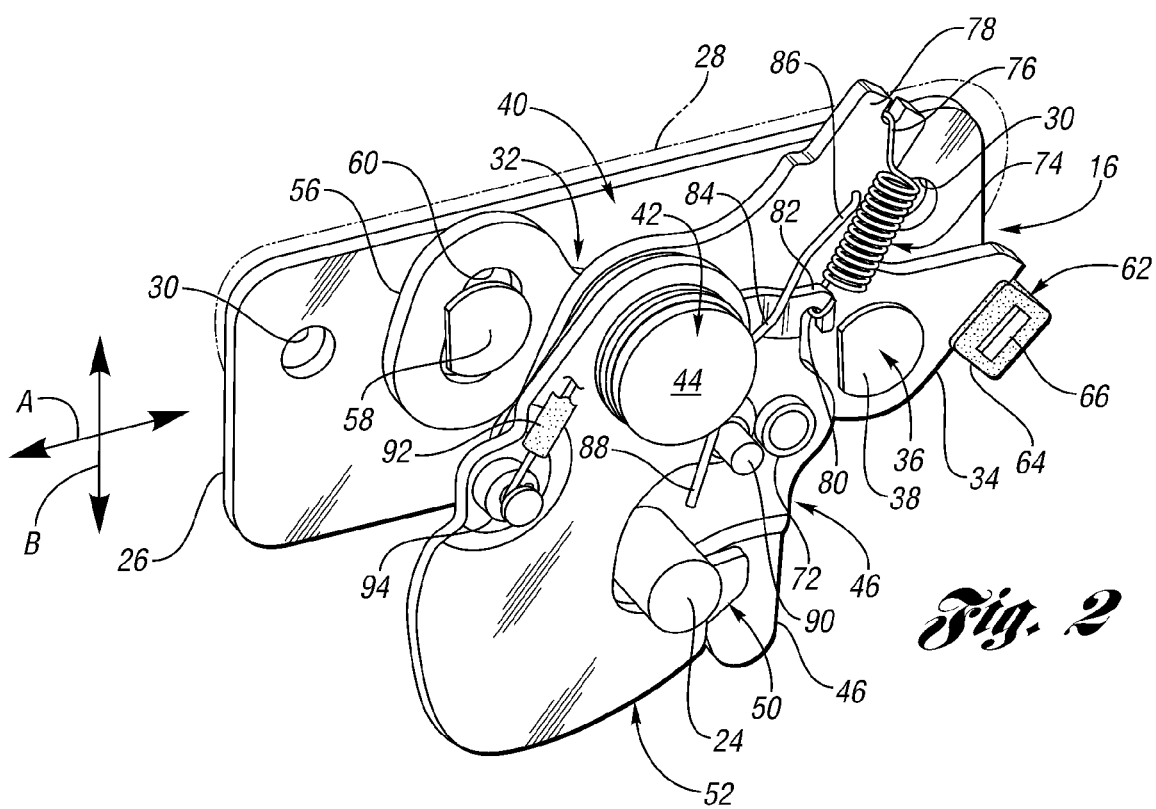
FIG. 2 is a perspective view illustrating the vehicle seat latch of the invention which is secured to a vehicle body mounted striker in the latched position shown and provides compliance that accommodates for striker position variation in transverse directions.

With reference to FIG. 2, the latch 16 of the invention includes a mounting plate 26 for mounting on a frame 28 of the seat as illustrated partially by phantom line representation. Holes 30 in the mounting plate receive suitable unshown fasteners for providing the mounting. It should be mentioned that, while the latch 16 could be mounted directly to the seat frame, provision of the mounting plate 26 allows the seat frame to be more easily designed because its mounting hole locations can be at different positions and still position the latch components at the required position with respect to the striker.

Figure 3:
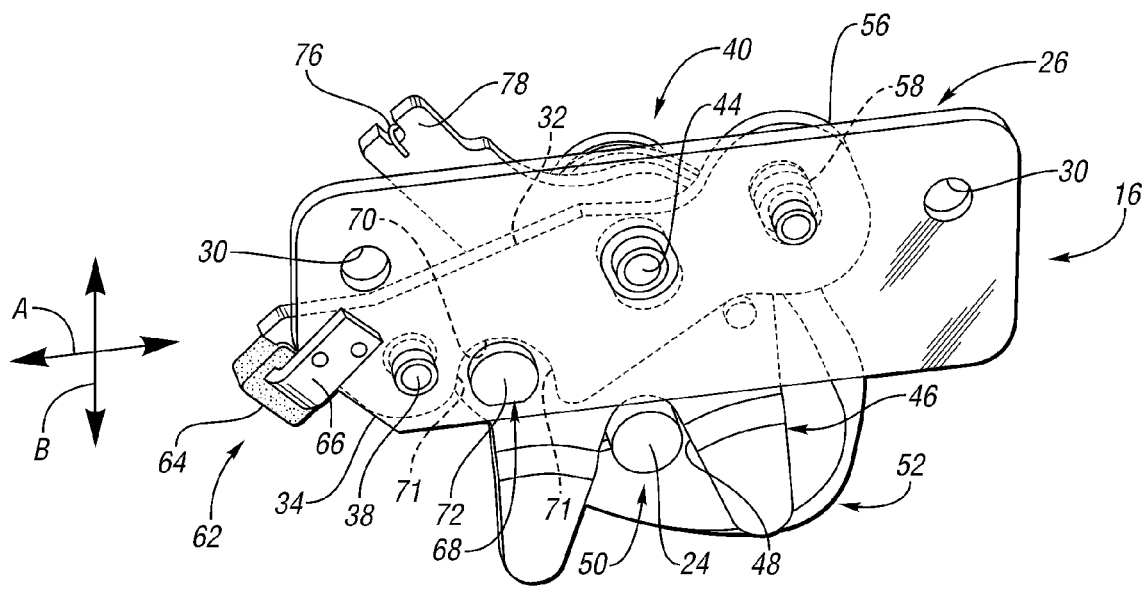
FIG. 3 is a perspective view of the seat latch taken from the back side of the latch as shown in FIG. 2.

The seat latch 16 also includes an elongate pivot plate 32 having a first end 34 including a first pivotal connection 36 to the mounting plate 26 as provided by a headed pin 38. This pivot plate 32 extends in the first direction shown by horizontal arrows A from the pivotal connection 36 as also shown in FIG. 3. A latch assembly 40 has a second pivotal connection 42 to the pivot plate 26 as provided by a headed pin 44 at a spaced location from the first pivotal connection 36, such that pivoting of the pivot plate about the first pivotal connection moves the latch assembly in the second vertical direction shown by arrows B transverse to the first longitudinal horizontal direction shown by arrows A.

Figure 4:
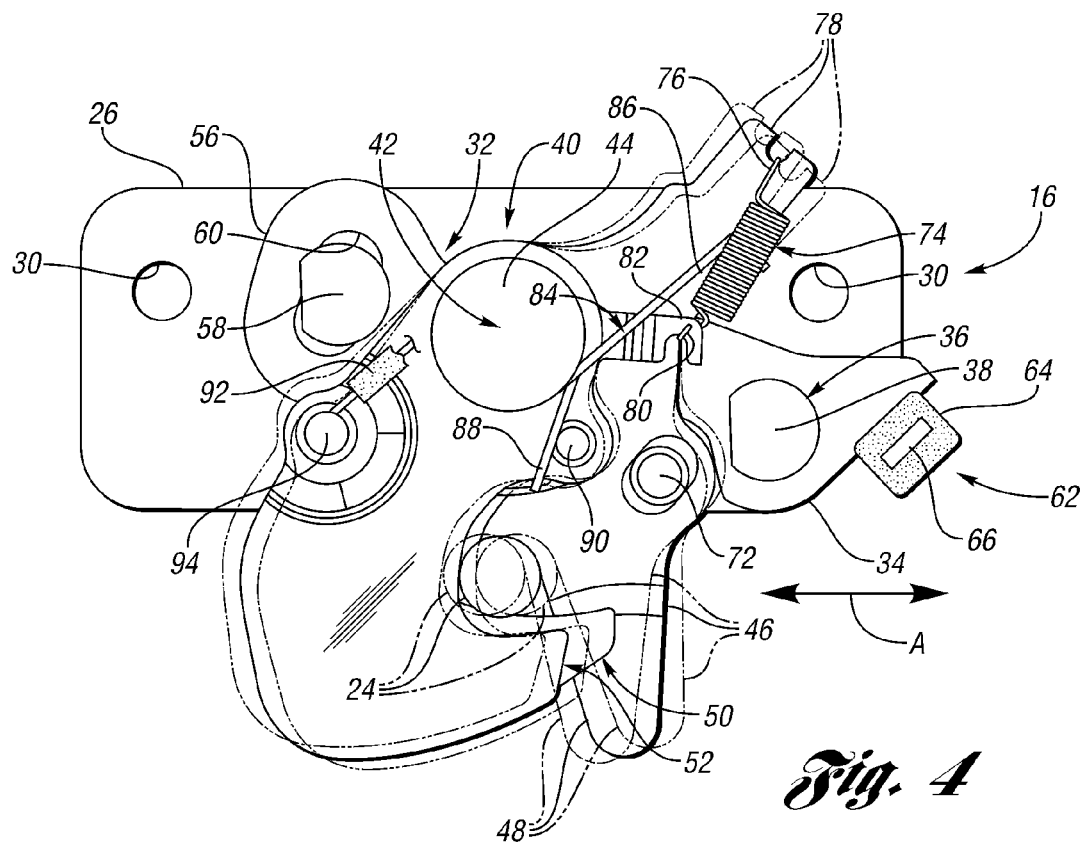
FIG. 4 illustrates the manner in which the seat latch provides compliance that accommodates for striker position variation in a first direction.

As shown in FIGS. 2, 3 and 4, the latch assembly 40 includes a throat plate 46 pivotally mounted on the pivot plate 32 by the pin 44 of the second connection 42. This throat plate 46 has a throat 48 that opens downwardly to receive the associated striker 24 on the vehicle body upon movement toward the striker. During such movement, the throat plate pivots as illustrated in FIG. 4 to provide compliance that accommodates for striker position variation along the first horizontal direction shown by arrows A.

Figure 5:
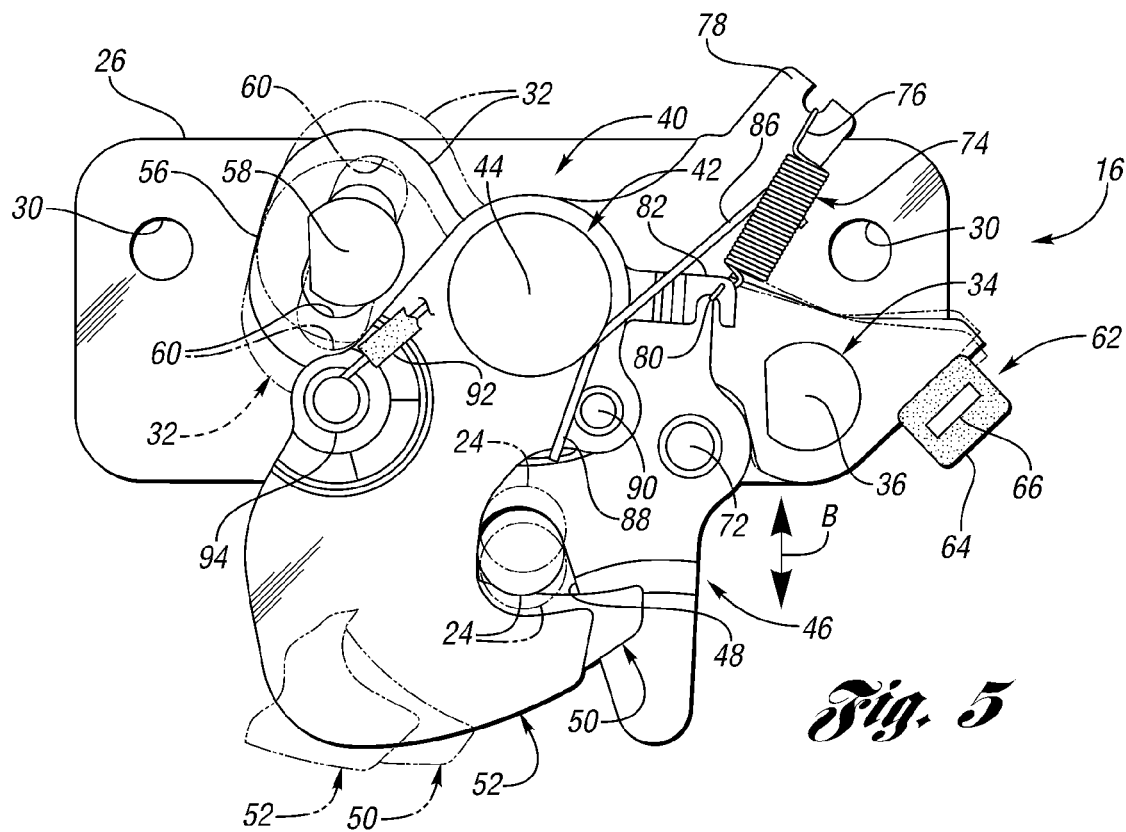
FIG. 5 is a view similar to FIG. 4 illustrating how the seat latch provides compliance that accommodates for striker position variation in a second direction.

As shown in FIG. 5, the latch assembly 40 includes at least one latch member and as disclosed includes a pair of latch members 50 and 52 mounted by the second pivotal connection 42 for movement between the latched position shown by solid line representation and unlatched positions shown by phantom line representation. In the latched position as is hereinafter more fully described, the one latch member 50 upon moving to the latched position with the striker 24 in the throat 48 of the throat plate 46 contacts the striker and provides pivoting of the pivot plate 32 to move the second pivotal connection along the vertical second direction shown by the vertical arrows B to provide compliance that accommodates for striker position variation along that direction.

Thus, as described above, the throat plate pivoting illustrated in FIG. 4 provides compliance that accommodates for striker position variation along the horizontal direction as shown by arrows A in FIG. 4 and the pivoting of the pivot plate 32 provides compliance that accommodates for striker position variation along the second direction shown by the vertical arrows B in FIG. 5.

Figure 6:
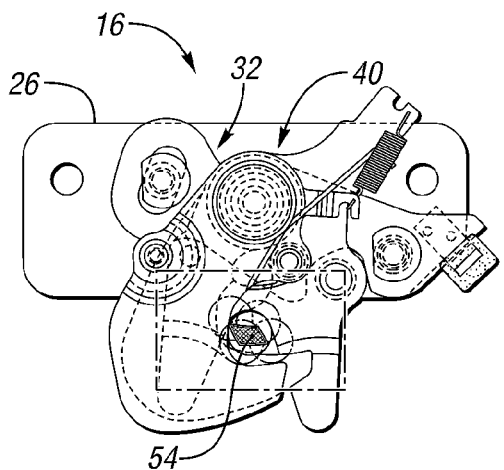
FIG. 6 is a view similar to FIG. 5 showing the range of positions the latch can provide compliance in transverse directions.
Figure 7:
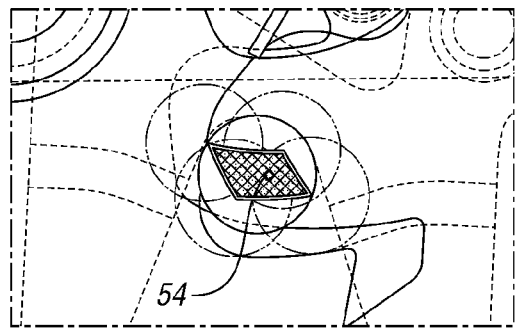
FIG. 7 is an enlarged view of a portion of FIG. 7 showing the area of compliance in the transverse directions.
Figure 8:
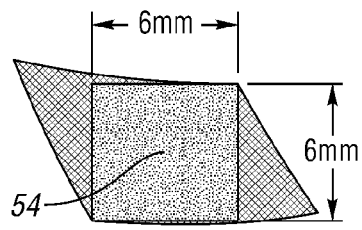
FIG. 8 is a further enlarged view showing an exemplary area of compliance the latch can accommodate for striker centerline position variation in the transverse directions.

FIGS. 6, 7 and 8 illustrate an exemplary somewhat curved parallelogram shape of the permitted compliance that permits striker centerline position variation in a square area 54 having 6 mm sides along the transverse directions.

As previously mentioned, the seat latches 16 illustrated are specifically constructed to secure a seat bottom frame to a floor of the vehicle body with the pivot plate 32 extending horizontally in the first direction and with the second connection 42 moving vertically in the second direction as the pivot plate pivots.

As shown in FIGS. 2-5, the elongate pivot plate 32 has a second end 56 spaced from its first end 34 with the second pivotal connection 42 between these ends. A stop 58 of a headed pin construction on the mounting plate 26 contacts the second end 56 of the pivot plate 32 to limit its pivoting movement that provides the movement of the second pivotal connection 42 for providing the compliance that accommodates for any striker position variation in the second direction shown by the vertical arrows B. More specifically, the second end 56 of the pivot plate has an opening 60 that receives the stop 58 on the mounting plate 26 to limit the pivoting movement of the pivot plate 32. Upon application of an upward or downward force to the latch, the stop 58 and slot 60 limit the extent of pivoting of the pivot plate 32 and thus provide a load holding function of the latch.

The seat latch 16 as shown in FIGS. 2-5 has its mounting plate 26 provided with a biaser 62 that biases the pivot plate 32 to move the second pivotal connection 42 toward the striker. More specifically, the biaser 62 includes an elastic bumper 64 mounted by a support 66 on the mounting plate 26 in contact with the first end 34 of the pivot plate 32 to provide its bias that moves the second pivotal connection 42 downwardly toward the striker.

The seat latch is constructed as best shown in FIG. 3 with its pivot plate 32 having a stop 68 that contacts the throat plate 46 to limit its pivotal movement on the pivot plate. More specifically, this stop 68 is embodied by an opening 70 of the pivot plate and the throat plate includes a pin 72 received within that opening to limit the pivoting of the throat plate by contact with opposite sides 71 of the opening 70.

As best illustrated in FIG. 5, the latch member 50 of the latch assembly 40 has a latched position contacting the striker 24 with a pressure angle in the range of 6 to 9 degrees. More specifically, the point of contact between the striker 24 and the latch member 50 has a tangent thereto whose complement defines an angle of about 6 to 9 degrees with a line from that point of contact to the center of the second pivotal connection 42. This construction of the latch member 50 allows it to latch to strikers having tolerance size variance and to maintain contact while still being movable to its unlatched position for release of the latch from the striker. The other latch member 52 has a latched position where it is spaced from the striker. Specifically, a line through the center of the second pivotal connection 42 and the center of the striker 24 would define zero degree angle with a 90 degree angle to a tangent with the latch member 52 where that line extends to the latch member 52. As such, the latch member 52 insures retention of the latch to the striker even upon excessive loading when the latch member 50 may not remain in its latched position.

If the latch assembly only includes a single latch 52 that directly contacts the striker 24, it would have a pressure angle of about 5.7 degrees at its contact point with the striker to provide retention to the striker while facilitating unlatching as described below.

A spring 74 shown in FIG. 2 has a first end 76 hooked to an arm 78 of the throat plate 46 and has a second end 80 hooked to an arm 82 of the latch member 50 to bias this latch member toward its latched position. A spring 84 extends around the pin 44 of the second connection 42 and has ends 86 and 88 respectively connected to the arm 78 of the throat plate 46 and to a pin 90 on the latch member 52 to bias this latch member toward its latched position. Thus, springs 74 and 84 provide a spring biaser that biases the latch members toward their latched positions.

A release connection 92 is disclosed as including a cable wire having a connection to a pin 94 on the latch member 52 and is operable to pivot the latch member 52 clockwise to its unlatched position as shown by partial phantom line representation in FIG. 5. As the latch member 52 is pivoted toward its unlatched position, the pin 90 on this latch member has a back side that contacts the latch member 50 to likewise move it to its unlatched position and thereby entirely release the latch from the striker 24. The pressure angle between the latch member 50 and the striker as previously mentioned in the range of 6 to 9 degrees facilitates this release of the striker unlike the 0 degree pressure angle of the latch member 52 that is capable of holding the striker even upon excessive loading.

Vehicle seats are conventionally mounted on a vehicle floor by four latches, i.e., two rear latches and two front latches at opposite lateral extremities of the seat. Only one of these four latches needs to have the compliance in the vertical direction provided by the latch assembly 40 mounted on the pivot plate 32 as described above, since any three locations define a plane and only the fourth location can be out of plane so as to require tolerance compliance. However, one of the two latches at the opposite lateral side of the seat as the present latch 16 must have horizontal compliance in the longitudinal direction to accommodate for longitudinal position tolerance of the striker locations; this can be accomplished by pivotally mounting the latch assembly 40 directly on the seat mounting plate 28 without the pivot plate 32. Nevertheless, two of the latches 16 can also be used, one at each lateral side, to reduce the number of different latches required for the seat mounting.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat latch for securing a vehicle seat to a vehicle body in which the seat is to be used, comprising:
    an elongate pivot plate having an end including a first pivotal connection for mounting on a frame of the seat with the pivot plate extending therefrom in a first direction;
    a latch assembly having a second pivotal connection to the pivot plate at a spaced location from the first pivotal connection such that pivoting of the pivot plate about the first pivotal connection moves the latch assembly in a second direction transverse to the first direction;
    the latch assembly including a throat plate pivotally mounted on the pivot plate by the second pivotal connection and having a throat for receiving a striker on the vehicle body upon movement toward the striker as the throat plate pivots to provide compliance that accommodates for striker position variation along the first direction; and
    the latch assembly having at least one latch member pivotally mounted by the second pivotal connection for movement between latched and unlatched positions to respectively secure or release the striker and, upon moving to the latched position with the striker in the throat of the throat plate, pivoting the pivot plate to move the second pivotal connection along the second direction and provide compliance that accommodates for striker position variation along the second direction.

2. A vehicle seat latch as in claim 1 that is constructed to secure a seat bottom frame to a floor of the vehicle body with the pivot plate extending horizontally in the first direction and with the second connection moving vertically in the second direction as the pivot plate pivots.

3. A vehicle seat as in claim 1 further including a mounting plate for mounting on the seat frame and on which the first pivotal connection mounts the pivot plate.

4. A vehicle seat latch as in claim 3 wherein the pivot plate has a second end spaced from its first mentioned end with the second pivotal connection therebetween, and the mounting plate having a stop for contacting the second end of the pivot plate to limit its pivoting movement that provides the movement of the second pivotal connection for providing the compliance that accommodates for striker positioning variation in the second direction.

5. A vehicle seat latch as in claim 4 wherein the second end of the pivot plate has an opening that receives the stop of the mounting plate to limit the pivoting movement of the pivot plate.

6. A vehicle seat latch as in claim 5 wherein the mounting plate includes a biaser that biases the pivot plate to move the second pivotal connection toward the striker.

7. A vehicle seat latch as in claim 6 wherein the biaser of the mounting plate includes an elastic bumper in contact with the first mentioned end of the pivot plate to provide its bias that moves the second pivotal connection toward the striker.

8. A vehicle seat latch as in claim 1 wherein the pivot plate includes a stop that contacts the throat plate to limit its pivotal movement on the pivot plate.

9. A vehicle seat latch as in claim 8 wherein the pivot plate includes an opening that embodies its stop and wherein the throat plate includes a pin received within the opening providing the stop of the pivot plate to limit the pivoting of the throat plate.

10. A vehicle seat latch as in claim 1 wherein the latch assembly includes a pair of latch members, one latch member having a latched position contacting the striker with a pressure angle in the range of 6 to 9 degrees, and the other latch member having a latched position where it is spaced from the striker.

11. A vehicle seat latch as in claim 8 wherein the latch assembly also includes a spring biaser that biases the latch members toward their latched positions, and a release connection for moving the other latch member from its latched position to an unlatched position and for also moving the one latch member from its latched position to its unlatched position.

12. A vehicle floor seat latch for securing a vehicle seat to the floor of a vehicle body in which the seat is to be used, comprising:
    a mounting plate for attachment to a frame of the vehicle seat;
    an elongate pivot plate having an end including a first pivotal connection to the mounting plate with the pivot plate extending generally horizontally therefrom;
    a latch assembly having a second pivotal connection to the pivot plate at a spaced location from the first pivotal connection such that pivoting of the pivot plate about the first pivotal connection moves the latch assembly vertically;

the latch assembly including a throat plate pivotally mounted on the pivot plate by the second pivotal connection and having a downwardly opening throat for receiving a striker on the floor of the vehicle body upon downward movement from above the striker as the throat plate pivots to provide longitudinal compliance that accommodates for longitudinal striker position variation; and the latch assembly having a pair of latch members pivotally mounted by the second pivotal connection for movement between latched and unlatched positions to respectively secure or release the striker, one latch member having a latched position contacting the striker with a pressure angle in the range of 6 to 9 degrees, the one latch member upon moving to its latched position with the striker in the throat of the throat plate pivoting the pivot plate to move the second pivotal connection vertically and provide vertical compliance that accommodates for vertical striker position variation, and the other latch member having a latched position where it is spaced from the striker.

13. A vehicle floor seat latch for securing a vehicle seat to the floor of a vehicle body in which the seat is to be used, comprising:

a mounting plate for attachment to a frame of the vehicle seat;

an elongate pivot plate having a first end including a first pivotal connection to the mounting plate, and the pivot plate having a second end spaced horizontally from its first end;

a latch assembly having a second pivotal connection to the pivot plate between its first and second ends such that pivoting of the pivot plate about the first pivotal connection moves the latch assembly vertically;

the latch assembly including a throat plate pivotally mounted on the pivot plate by the second pivotal connection and having a downwardly opening throat for receiving a striker on the floor of the vehicle upon downward movement from above the striker as the throat plate pivots to provide longitudinal compliance that accommodates for longitudinal striker position variation;

the latch assembly having a pair of latch members pivotally mounted by the second pivotal connection for movement between latched and unlatched positions to respectively secure or release the striker, one latch member having a latched position contacting the striker with a pressure angle in the range of 6 to 9 degrees, the one latch member upon moving to its latched position with the striker in the throat of the throat plate pivoting the pivot plate to move the second pivotal connection vertically and provide vertical compliance that accommodates for vertical striker position variation, and the other latch member having a latched position where it is spaced from the striker;

a spring biaser that biases the latch members toward their latched positions; and a release connection for moving the other latch member from its latched position to an unlatched position and for moving the one latch member from its latched position to its unlatched position.

* * * * *